United States Patent [19]
Liu et al.

[11] Patent Number: 5,761,714
[45] Date of Patent: Jun. 2, 1998

[54] SINGLE-CYCLE MULTI-ACCESSIBLE INTERLEAVED CACHE

[75] Inventors: Peichun Peter Liu; Rajinder Paul Singh, both of Austin, Tex.

[73] Assignee: International Business Machines Corporation, Armonk, N.Y.

[21] Appl. No.: 638,263

[22] Filed: Apr. 26, 1996

[51] Int. Cl.⁶ .................................................. G06F 12/00
[52] U.S. Cl. .......................... 711/127; 711/108; 711/131; 711/145
[58] Field of Search .................................. 395/435, 454, 395/456, 458, 472; 711/108, 127, 129, 131, 145

[56] References Cited

U.S. PATENT DOCUMENTS

| | | | |
|---|---|---|---|
| 4,724,518 | 2/1988 | Steps | 395/454 |
| 5,295,252 | 3/1994 | Torii et al. | 395/454 |
| 5,559,986 | 9/1996 | Alpert et al. | 395/471 |
| 5,640,534 | 6/1997 | Liu et al. | 395/473 |
| 5,689,680 | 11/1997 | Whittaker et al. | 711/127 |

Primary Examiner—Tod R. Swann
Assistant Examiner—Conley B. King, Jr.
Attorney, Agent, or Firm—Anthony V. S. England; Anthony P. Ng; Andrew J. Dillon

[57] ABSTRACT

An interleaved cache memory having a single-cycle multi-access capability is disclosed. The interleaved cache memory comprises multiple subarrays of memory cells, an arbitration logic circuit for receiving multiple input addresses to those subarrays, and an address input circuit for applying the multiple input addresses to these subarrays. Each of these subarrays includes an even data section and an odd data section and three content-addressable memories to receive the multiple input addresses for comparison with tags stored in these three content-addressable memories. The first one of the three content-addressable memories is associated with the even data section and the second one of the three content-addressable memories is associated with the odd data section. The arbitration logic circuit is then utilized to select one of the multiple input addresses to proceed if more than one input address attempts to access the same data section of the same subarray.

15 Claims, 5 Drawing Sheets

SINGLE-CYCLE MULTI-ACCESSIBLE INTERLEAVED CACHE

RELATED PATENT APPLICATIONS

Related patent applications include copending application U.S. Ser. No. 08/319,201 filed Oct. 5, 1994, entitled "Method and System for Miss Sequence Handling in a Data Cache Array Having Multiple Content Addressable Fields Per Cache Line" (IBM Docket No. HQ9-094-023) and copending application U.S. Ser. No. 08/319,202 filed Oct. 5, 1994, now U.S. Pat. No. 5,668,972, entitled "Method and System for Efficient Miss Sequence Cache Line Allocation" (IBM Docket No. HQ9-094-025). Both copending applications are hereby incorporated herein by reference thereto.

BACKGROUND OF THE INVENTION

1. Technical Field

The present invention relates in general to data processing systems and, in particular, to a cache memory for utilization within high-speed data processing systems. Still more particularly, the present invention relates to a cache memory that is capable of being accessed by multiple input addresses within a single processor cycle.

2. Description of the Prior Art

Many high-performance data processing systems include both a system memory and a cache memory. A cache memory is a relatively high-speed memory that stores a copy of information that is also stored in one or more portions of the system memory. The cache memory can be integrated within a processor device of the data processing system or remain separate from the processor device of the data processing system.

For a high-speed processor device such as a superscalar RISC processor where more than one instruction can be executed during a single processor cycle, demands for simultaneous multiple accesses to the cache memory are increasing. The processor device may have to access more than one effective address and/or real address of the cache memory in a single processor cycle. Hence, a cache memory is often partitioned into multiple subarrays (i.e., interleaved) in order to achieve single-cycle multi-access capability. An interleaved cache memory has the potential of being accessed by more than one address and producing more than one data output in a single processor cycle.

Although various arrangements of subarrays allow simultaneous multiple accesses to the cache memory, each of these accesses must still be in a separate subarray of the cache memory. This is because only one cache line within a single subarray can be driven by the wordline driver circuit at a time. Hence, if more than one access to the cache lines in a single subarray is attempted, arbitration logic of the cache memory will allow one of the accesses to proceed before the rest. This practically reduces the effectiveness of the single-cycle multi-access capability of an interleaved cache, especially when the interleave factor is so small (of less than four subarrays) that all the parallel accesses tend to occur within the same subarray.

Increasing the interleave factor of a cache memory would certainly enhance its single-cycle multi-access capability. However, prior art solution of increasing the number of subarrays within the cache memory or utilizing a dual-ported cache memory array tend to be quite expensive due to the excessive penalty in chip real estate required and increased design complexity. Consequently, it would be desirable to provide an improved cache memory organization that maximizes the interleave factor while minimizing the physical placement area required within the chip, along with an associated method to access this cache memory such that simultaneous multiple-access capability can be greatly enhanced.

SUMMARY OF THE INVENTION

In view of the foregoing, it is therefore one object of the present invention to provide an improved cache memory for a high-speed data processing system.

It is another object of the present invention to provide an improved cache memory which allows multiple accesses in a single processor cycle.

It is yet another object of the present invention to provide an improved cache memory having a maximized interleave factor and a minimal physical area requirement such that single-cycle multi-access capability can be enhanced.

In accordance with the method and system of the present invention, an interleaved cache memory is provided which comprises multiple subarrays of memory cells, an arbitration logic circuit for receiving multiple input addresses to those subarrays, and an address input circuit for applying the multiple input addresses to these subarrays. Each of these subarrays includes an even data section and an odd data section and three content-addressable memories to receive the multiple input addresses for comparison with tags stored in these three content-addressable memories. The first one of the three content-addressable memories is associated with the even data section and the second one of the three content-addressable memories is associated with the odd data section. The arbitration logic circuit is then utilized to select one of the multiple input addresses to proceed if more than one input address attempts to access the same data section of the same subarray.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF PREFERRED EMBODIMENT

The present invention may be implemented in any cache-based data processing system. Also, it is understood that the features of the present invention may be applicable in various data processing systems as a primary cache, a secondary cache, translation buffers and the like, wherever a content-addressable memory is useful, or wherever multiple memory accesses are required.

Figure 1:
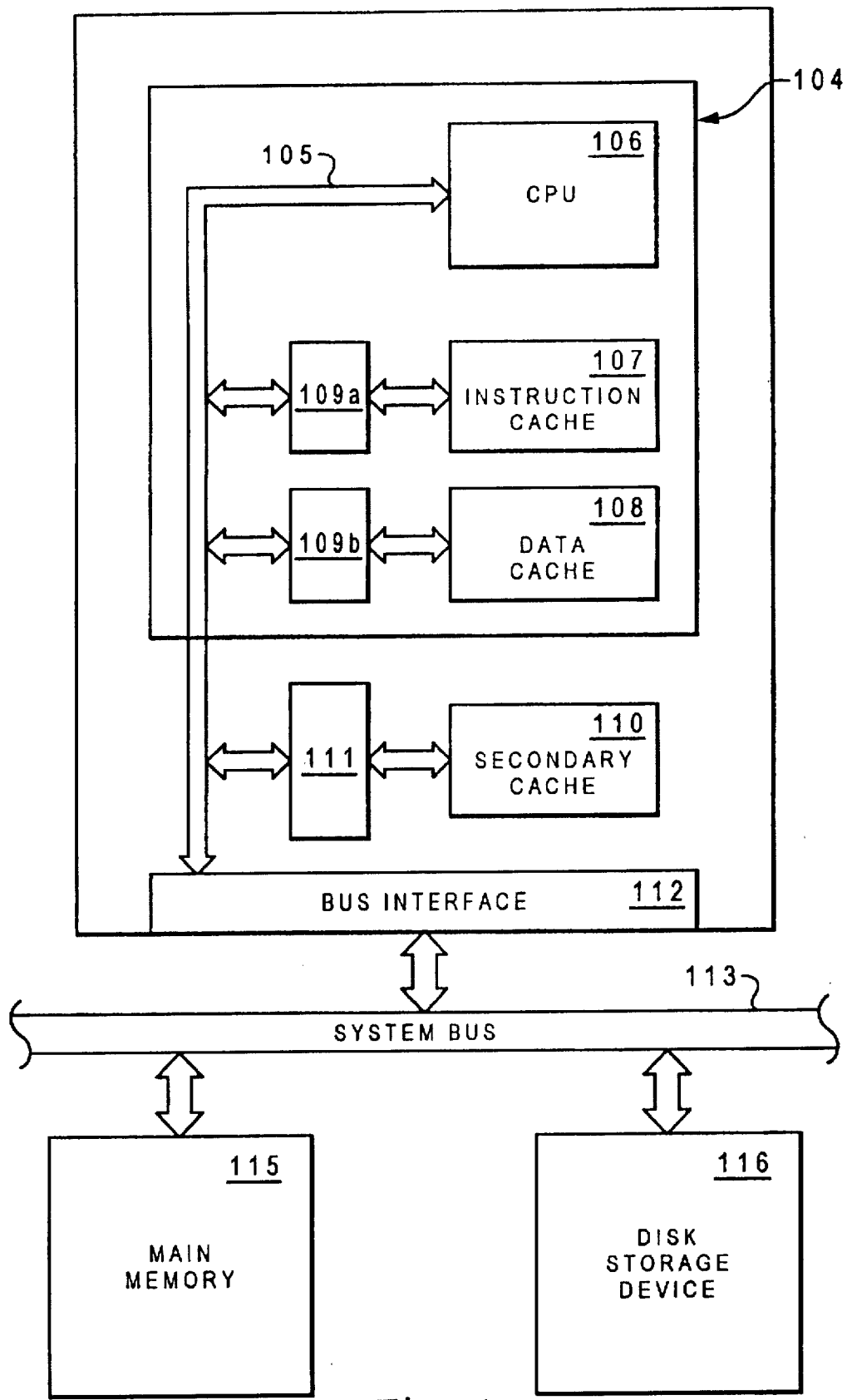
FIG. 1 is a block diagram of a data processing system having a cache memory according to a preferred embodiment of the invention.

Referring now to the drawings and in particular to FIG. 1, there is illustrated a block diagram of a typical data processing system in which a cache memory may be incorporated according to a preferred embodiment of the invention. In FIG. 1, only a single processor 104 is shown; however, the features of the present invention are also useful in a multi-processor system. Processor 104, having a CPU 106 which may be of a superscalar RISC type, is constructed as a single-chip device comprising on-chip instruction cache 107 and data cache 108. Both caches 107, 108 are connected to CPU 106 by separate paths within a local bus structure. Instruction cache 107 is connected to local bus 105 via cache controller 109a, while data cache 108 is connected to local bus 105 via cache controller 109b. A secondary cache 110 is also connected to local bus 105 via cache controller 111. Secondary cache 110 is usually much larger than either instruction cache 107 or data cache 108, and that access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113.

Instruction cache 107 and data cache 108 may be addressed by effective (i.e., untranslated) addresses as well as by real (i.e., physical) addresses. Thus, local bus 105 within processor 104 has a number of address buses, including effective address buses, real address buses, and instruction address buses. In contrast, secondary cache 110 is typically addressed by real addresses only.

The memory hierarchy is from the fastest to the slowest, from the smallest to the largest, and from the most expensive per bit to the least expensive per bit, in progression from caches 107, 108 to secondary cache 110, to main memory 115, and to disk storage device 116. Typically, main memory 115 contains a subset of what is in disk storage device 116, secondary cache 110 contains a subset of what is in main memory 115, and each of caches 107, 108 contains a subset of what is in secondary cache 110. CPU 106 can access caches 107, 108 within a processor cycle, while it may take several processor cycles to access secondary cache 110. If a cache "miss" occurs in caches 107, 108, and secondary cache 110, then main memory 115 is accessed to perform a cache linefill operation—replacing a cache line with an equivalent bit portion from main memory 115 which contains the addressed data. This cache linefill operation must be performed in order to satisfy the attempted cache access for which a cache "miss" occurred. If main memory 115 does not contain the location for which the cache linefill operation is attempted, then a page containing this data is obtained from disk storage device 116 such that the cache linefill operation can be completed. The time for acquiring a page from disk storage device 116 and writing it to main memory 115 typically requires many thousands of processor cycles, during which CPU 106 may be switched to do another task or stalled in order to wait for the data to satisfy the request.

Figure 2:
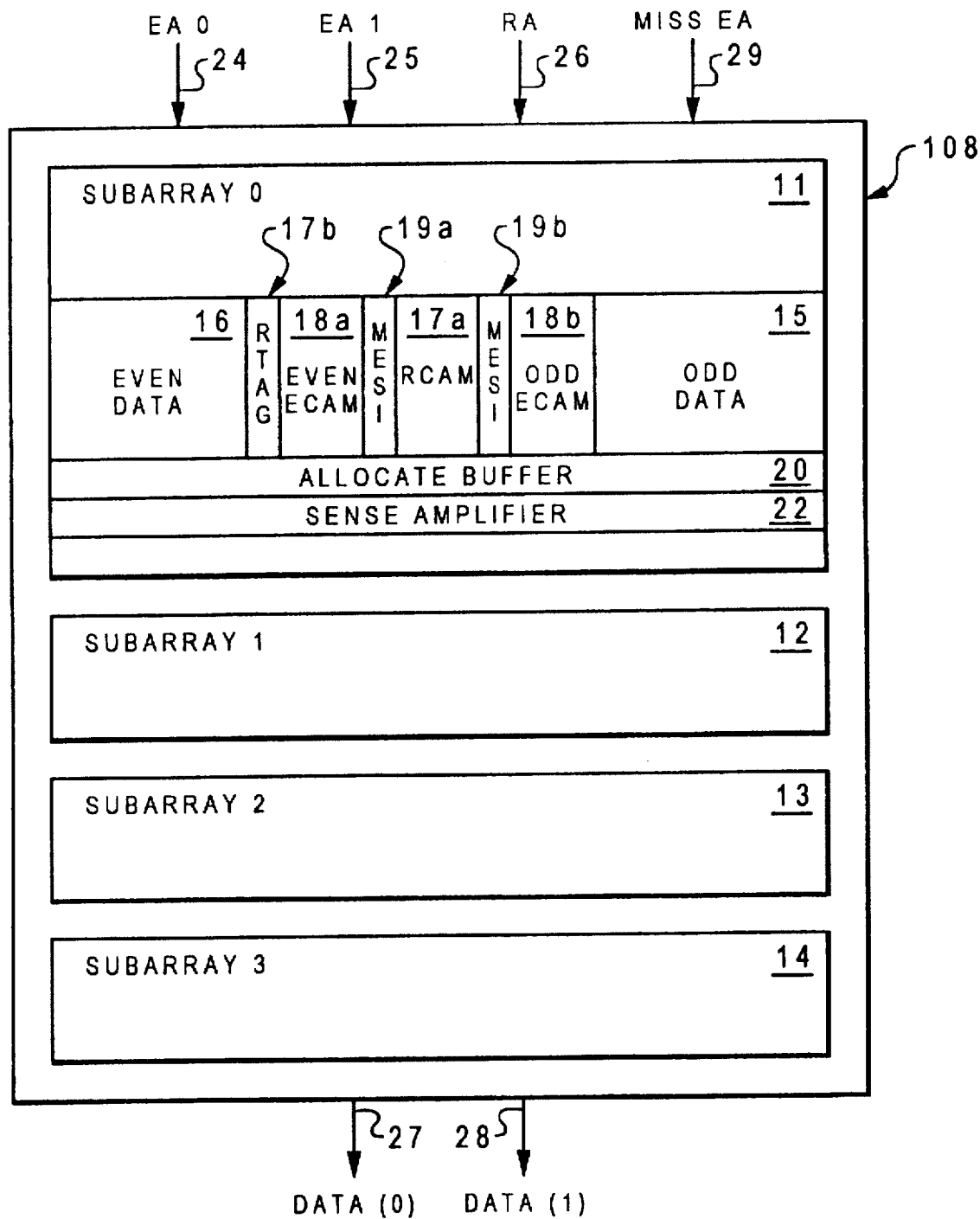
FIG. 2 is a block diagram of a cache memory having four subarrays, in accordance with a preferred embodiment of the present invention.

Referring now to FIG. 2, there is illustrated a block diagram of data cache 108 which may incorporate features of the invention. According to a preferred embodiment, data cache 108 is a static random access memory (RAM) device having address-compare circuits that are configured as content-addressable memory (CAM) elements. There are four external address ports to data cache 108. EA0 24 and EA1 25 are for effective addresses while RA 26 is for real address. Miss EA 29 is preferably for effective address of a line that is being processed by cache "miss" logic (i.e., cache linefill operation); however Miss EA 29 may also be utilized for other types of input accesses. According to a preferred embodiment of the invention, data cache 108 is physically divided into four subarrays—subarray 11, subarray 12, subarray 13, and subarray 14. As shown in FIG. 2, subarrays 11–14 and the data cell arrays within each of subarrays 11–14, such as data cell arrays 15, 16, are optimally placed to reduce wire length and chip areas. Because all subarrays 11, 12, 13, and 14 are of identical construction, only subarray 11 will be described in detail for the purpose of disclosing the present invention.

Subarray 11 contains 128 cache lines. Each of these 128 cache lines are physically divided into two sections—an odd double-word section and an even double-word section, though logically both sections belong to the cache line. The odd double-word section is located in data cell array 15 while the even double-word section is located in data cell array 16. Each double-word section is 512 bit wide. Thus, subarray 11 is 512+512=1024 bits wide and 128 bits deep, having a total of 16 Kbytes. By defining a double-word (DW) equals to 64 bits (or 8 bytes), each of data cell arrays 15, 16 is 8 DW wide. In addition to the 1024-bit data field, each cache line preferably comprises a 128-bit parity field and various control fields such as a 31-bit odd RCAM field 17a, a 12-bit even ECAM field 18a, a 12-bit odd ECAM field 18b, a 3-bit even MESI field 19a, a 3-bit odd MESI field 19b, and a 28-bit even RTAG field 17b. Thus, there are over 1200 bits on each cache line.

As shown in FIG. 2, subarray 11 also includes an allocate buffer 20 for data cell arrays 15 and 16. Further, a sense amplifier 22 is provided for amplifying output signals from each bit-line pair. Data can be produced on two outputs, Data(0) 27 and Data(1) 28, at the same time. In other words, data cache 108 is capable of being simultaneously accessed by multiple addresses and is also capable of output multiple data within a same processor cycle.

Figure 3:
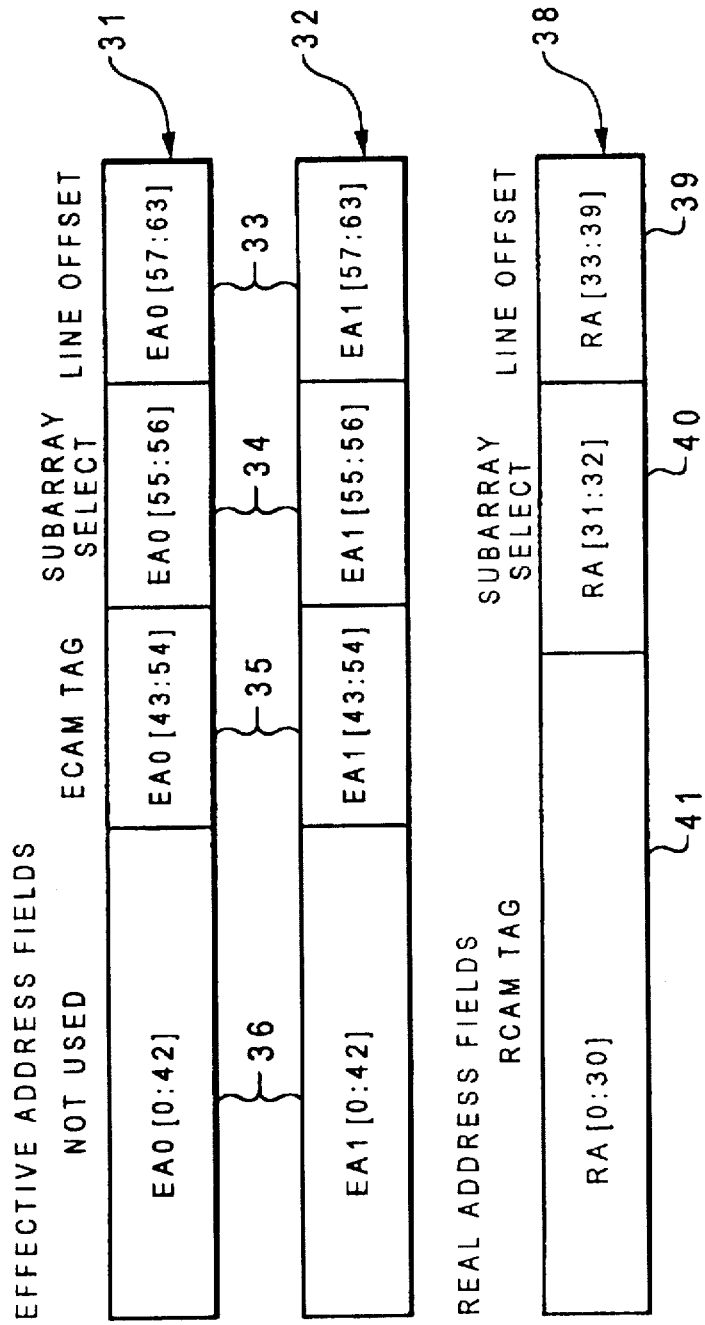
FIG. 3 is a diagram of a preferred format of the addresses that may be applied to the cache memory of FIG. 2.

Referring now to FIG. 3, there is depicted a graphic illustration of an addressing scheme which may be utilized for addressing data cache 108, according to a preferred embodiment of the present invention. The field allocation within effective addresses 31 and 32, respectively from input lines EA0 24 and EA1 25 of FIG. 2, are identical to each other. Each of effective addresses 31 and 32 is preferably 64-bits. As depicted, field 36, bits 0–42, is not utilized in the present invention. Field 34, bits 55–56, is utilized to select one of four subarrays 11–14 within data cache 108. Field 33, bits 57–63, represents the line offset of effective addresses 31, 32. Specifically, bit 60 is utilized to select a cache line from either odd data array 15 or even data array 16; bits 57–59 is utilized to select one of the eight DWs within the selected cache line; bits 61–63 is not utilized. Finally, field 35, bits 43–54, forms a tag to compare with a content-addressable memory field referred to herein as the "ECAM tag" present within even ECAM 18a and odd ECAM 18b of data cell array 16 and data cell array 15, respectively. The preferred format of an effective address for input line Miss EA 29 is identical with both EA0 24 and EA1 25.

A preferred embodiment of a 40-bit real address 38 which may be utilized with the present invention is also shown in FIG. 3. Similar to the effective addresses, field 40, bits 31–32, is utilized to select one of four subarrays 11–14 within data cache 108. Field 39, bits 33–39, is for the line offset of the real address. Specifically, bit 36 is utilized to select a cache line from either odd data array 15 or even data array 16; bits 33–35 is utilized to select one of the eight DWs within the selected cache line; bits 37–39 is not utilized. Finally, field 41, bits 0–30, is for an associated block of information that is stored within a second content-addressable field, referred to herein as the "RCAM tag," of RCAM 17a.

Thus, in accordance with the addressing scheme as depicted in FIG. 3, each block of information within a data processing system which incorporates data cache 108 of the present invention will include at least a separate and distinct content-addressable fields which may be utilized in conjunction with either effective addresses 31, 32 or real address 38 to select a block of information within one of the subarrays 11-14.

Figure 4:
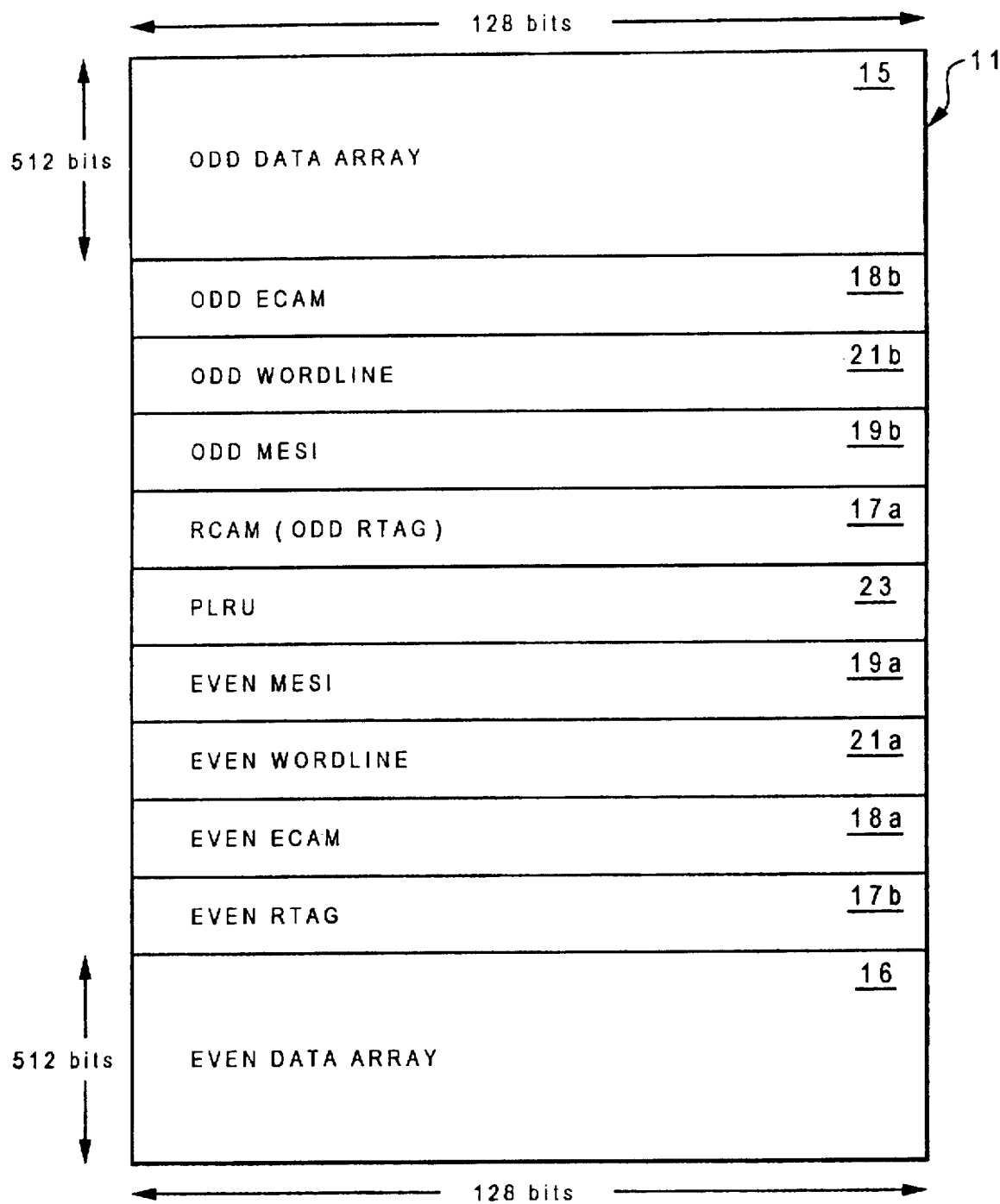
FIG. 4 is a detail view of one of the subarrays of the cache memory of FIG. 2.

Referring now to FIG. 4, there is illustrated a more detailed view of subarray 11. As mentioned above, the data section of subarray 11 is divided into two distinct sections—an odd data array 15 and an even data array 16. Each cache line within subarray 11 is preferably 1024-bit wide, having half of the cache line in odd data array 15 and half in even data array 16. Thus, both EA0 24 and EA1 26 (or any other two address combination) can simultaneously access subarray 11 as long as each of EA0 24 and EA1 26 is directed to a different data array 15 or 16. This arrangement of subarray 11 allows double-word interleaving within a same subarray such that the total interleave factor of a four-subarray data cache 108 is effectively increased.

In addition to the data arrays 15 and 16, the MESIs and the ECAMs are also respectively divided into both even and odd sections. MESI fields 19a, 19b contain control bits that are commonly utilized within data caches to signify modified, exclusive, shared, and invalid. Thus, the status of data for a particular cache line within data cache 108 may be rapidly and efficiently determined by interrogating the status of these MESI bits in MESI field 19a or 19b. Similarly, the status of data for that particular cache line may be altered by writing different bits into MESI field 19a or 19b.

Both ECAM 18a, 18b contain effective address directory information for the associated data. With the line-interleaving design, even ECAM 18a is for even data array 16 and odd ECAM 18b is for odd data array 15. As a preferred embodiment of the invention, an address arbitration logic allows an odd data address to address odd ECAM 18b in the same cycle as an even data address is accessing even ECAM 18a. A cache "hit" in any of ECAMs 18a, 18b will alert a cache line to an associated RCAM 17a (or RTAG) to gate out the real address to verify the "hit."

PLRU 23 is utilized to execute an algorithm called least recently used (LRU), or preferably Pseudo LRU in this embodiment, to decide a cache line in which the data should be discarded during a cache linefill operation. Wordline 21a and wordline 21b are the driver circuits for driving the global wordline within even data array 16 and odd data array 15, respectively.

Figure 5:
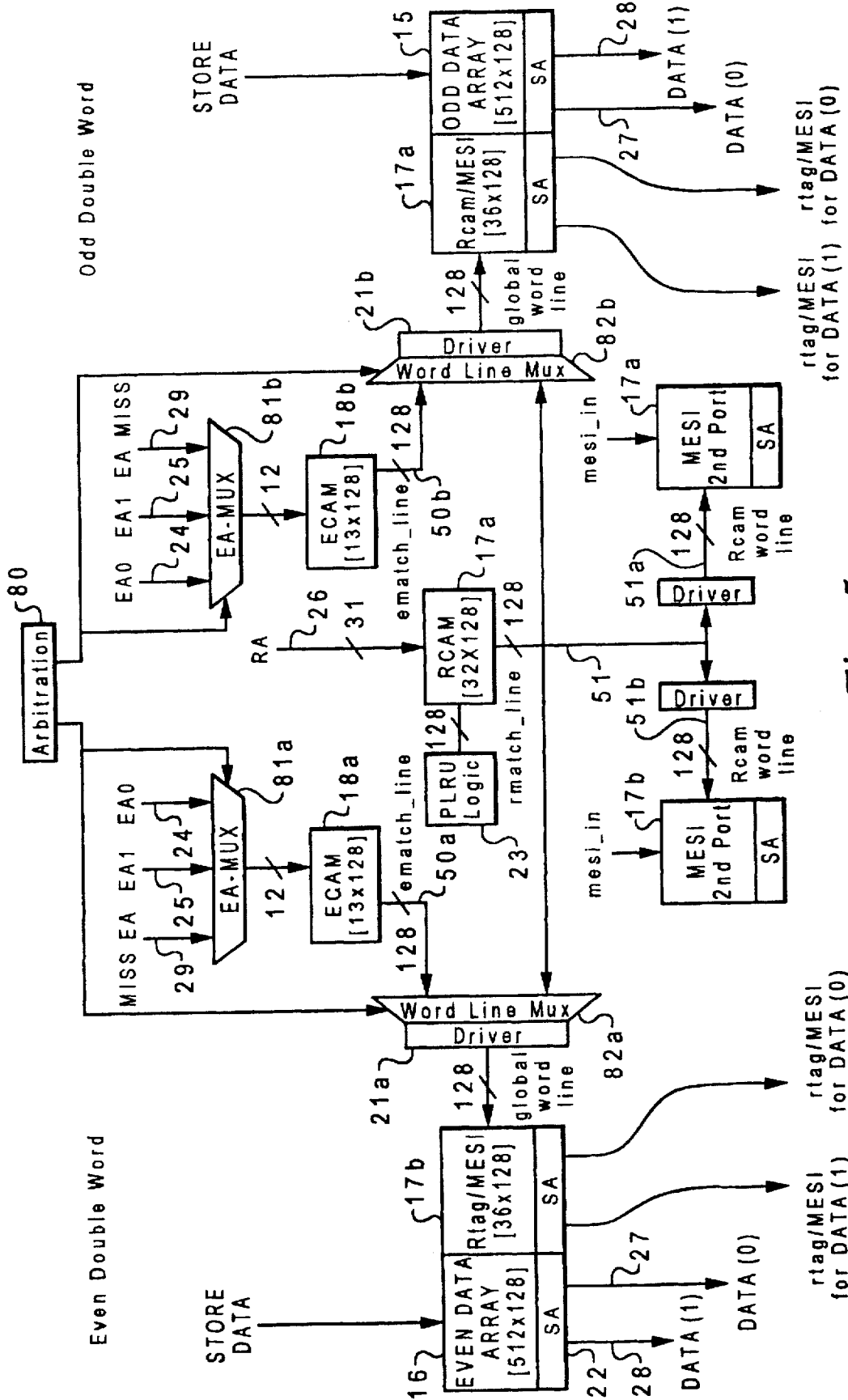
FIG. 5 is a block diagram illustrating the data flow within of the subarrays of the cache memory of FIG. 2.

Referring now to FIG. 5, there is illustrated a functional block diagram of the data flow within subarray 11 of data cache 108. Data cache 108 may receive three effective addresses, on EA0 24, on EA1 25, and Miss EA 29 respectively, and one real address on RA 26, at the same time. However, if two or more addresses attempts to access the same data section of the same subarray, then arbitration logic 80 will decide which one of the addresses is allowed to access, via multiplexers 81a and 81b.

Three separate and distinct content-addressable memories—RCAM 17a, even ECAM 18a, and odd ECAM 18b—are provided within subarray 11 to allow data to be accessed in a number of efficient sequences. RA 26 is applied to RCAM 17a, and EA0 24, EA1 25 and Miss EA 29 are applied to ECAMs 18a, 18b of subarray 11 (and other respective RCAMs and ECAMs for each of other subarrays 12-14) to determine if there is a match. When there is a match in ECAMs 18a and/or 18b, ematch__lines 50a and/or 50b are brought out respectively. When there is a match in RCAM 17a, rmatch__line 51 is brought out. Arbitration circuit 80 along with multiplexer 82a are utilized to select between ematch__line 50a and rmatch__line 51 for driving the global wordline. Similarly, arbitration circuit 80 along with multiplexer 82b are utilized to select between ematch__line 50b and rmatch__line 51 for driving the global wordline. The drivers within wordline 21a and/or 21b are responsible for driving the global wordline within data array 15 and/or 16.

For any of EA0 24, EA1 25 or Miss EA 29, data will be from either Data(0) 27 or Data(1) 28 and a respective tag output will be from either RTAG 17a or 17b. Tag output from either RTAG 17a or 17b must be compared with the real tag output from a memory management unit in order to verify the cache "hit." However, for RA 26, data from Data(0) 27 or Data(1) 28 can be obtained directly from data array 15 and/or 16 without tag verification.

An important feature of the present invention is that the process of matching the tags and addressing the array of data cells and producing a potentially usable data output can proceed while the arbitration and selection of output data is going on in parallel rather than sequential, and thus speed is enhanced. While arbitration logic 80 is determining which of the conflicting addresses should proceed, a parallel process of determining if there is a match is executing independently.

Both a load operation and a store operation can be performed in parallel within data cache 108. The following is an example illustrating a load request with an effective address in conjunction with a store request with a real address. For the load request, an effective address from any one of EA0 24, EA1 25 and Miss EA 29 can be selected by multiplexer 81a and 81b. The selected effective address is then sent to ECAM 18a, for example, for comparison. Wordline multiplexer 82a then select ematch__line 50a instead of rmatch__line 51 to drive the global word line. Finally, the data is read out from even data array 16 while its RTAG and MESI are read out from RTAG 17b. For the store request, real address 26 enters RCAM 17a for comparison. Wordline multiplexer 82b, for example, selects rmatch__line 51 to drive the global wordline for storing data to odd data array 15. At the same time rmatch__line 51 also drives RCAM wordlines 51a and 51b to update RCAM/MESI 17a and 17b respectively via a second port within RCAM/MESI 17a and 17b.

As has been described, the present invention provides an improved cache organization that maximizes the interleave factor as well as minimizes the physical placement of the chip, along with an associated method to access this cache memory such that simultaneous multiple-access capability can be greatly enhanced.

While the invention has been particularly shown and described with reference to a preferred embodiment, it will be understood by those skilled in the art that various changes in form and detail may be made therein without departing from the spirit and scope of the invention.

What is claimed is:

1. An interleaved cache memory comprising:

a plurality of subarrays of memory cells, wherein each of said plurality of subarrays further includes an even data section and an odd data section;

means for applying a plurality of input addresses to said plurality of subarrays during a single processor cycle;

at least three content-addressable memories in each of said plurality of subarrays for receiving said plurality of input addresses for comparison with tags stored in said at least three content-addressable memories, wherein a first one of said at least three content-addressable memories is associated with said even data section and a second one of said at least three content-addressable memories is associated with said odd data section; and arbitration means for selecting one of said plurality of addresses if more than one of said plurality of input addresses attempts to access an identical data section within any one of said plurality of subarrays.

2. The interleaved cache memory of claim 1, wherein a third one of said at least three content-addressable memories is associated with both said even data section and said odd section.

3. The interleaved cache memory of claim 1, wherein said plurality of input addresses comprises three effective addresses and one real address.

4. The interleaved cache memory of claim 1 further comprises means responsive to said plurality of input addresses for accessing two or more subarrays simultaneously.

5. The interleaved cache memory of claim 1 further comprises means responsive to said plurality of input addresses for accessing two or more data sections simultaneously.

6. The interleaved cache memory of claim 1 further comprises a plurality of MESI fields, wherein each MESI field includes at least two ports to be accessed by one of said at least three content-addressable memories.

7. A data processing system having single-cycle multi-accessible memory caching capability, said data processing comprising:

a cache memory, wherein said cache memory includes:

a plurality of memory cell subarrays, wherein each of said plurality of memory cell subarrays further includes an even data section and an odd data section;

means for applying a plurality of input addresses to said plurality of subarrays during a single processor cycle;

at least three content-addressable memories in each of said plurality of subarrays for receiving said plurality of input addresses for comparison with tags stored in said at least three content-addressable memories, wherein a first one of said at least three content-addressable memories is associated with said even data section and a second one of said at least three content-addressable memories is associated with said odd data section; and arbitration means for selecting of one of said plurality of addresses if more than one of said plurality of input addresses attempts to access an identical data section within any one of said plurality of subarrays.

8. The data processing system of claim 7, wherein a third one of said at least three content-addressable memories is associated with both said even data section and said odd section.

9. The data processing system of claim 7, wherein said plurality of input addresses comprises three effective addresses and one real address.

10. The data processing system of claim 7, wherein said cache memory further comprises means responsive to said plurality of input addresses for accessing two or more subarrays simultaneously.

11. The data processing system of claim 7, wherein said cache memory further comprises means responsive to said plurality of input addresses for accessing two or more data sections simultaneously.

12. The data processing system of claim 7, wherein said cache memory further comprises a plurality of MESI fields, wherein each MESI field includes at least two ports to be accessed by one of said at least three content-addressable memories.

13. A method of operating a cache memory having a plurality of subarrays of memory cells, wherein each subarray contains a plurality of cache lines, said method comprising the steps of:

separating each of said plurality of subarrays into an even data array and an odd data array;

associating three content-addressable arrays to each of said plurality of subarrays, wherein a first one of said three content-addressable arrays is associated to said even data array and a second one of said three content-addressable arrays is associated to said odd data array;

storing tags in each of said three content-addressable arrays for at least two types of addresses;

applying a plurality of input addresses to said plurality of subarrays during a single processor cycle;

receiving said plurality of input addresses for comparison with tags stored in said at least three content-addressable memories; and arbitrating and selecting one of said plurality of addresses if more than one of said plurality of input addresses attempts to access an identical data section within any one of said plurality of subarrays.

14. The method of operating a cache memory having a plurality of subarrays of memory cells of claim 13 further comprising the step of arbitrating a plurality of match lines to produce one global wordline signal for the same data section of the same subarray.

15. The method of operating a cache memory having a plurality of subarrays of memory cells of claim 13, wherein said step of receiving and said step of arbitrating are performed in each of said plurality of subarrays at the same time.

* * * * *

UNITED STATES PATENT AND TRADEMARK OFFICE
CERTIFICATE OF CORRECTION

PATENT NO. : 5,761,714
DATED : June 2, 1998
INVENTOR(S) : Liu et al.

It is certified that error appears in the above-indentified patent and that said Letters Patent is hereby corrected as shown below:

On the first page please change the attorney's name "Anthony P. Ng" to --Antony P. Ng--.

Signed and Sealed this

Thirteenth Day of October 1998

Attest:

BRUCE LEHMAN

Attesting Officer     Commissioner of Patents and Trademarks